2,943,132
PILOT BURNER AND THERMOCOUPLE THEREFOR

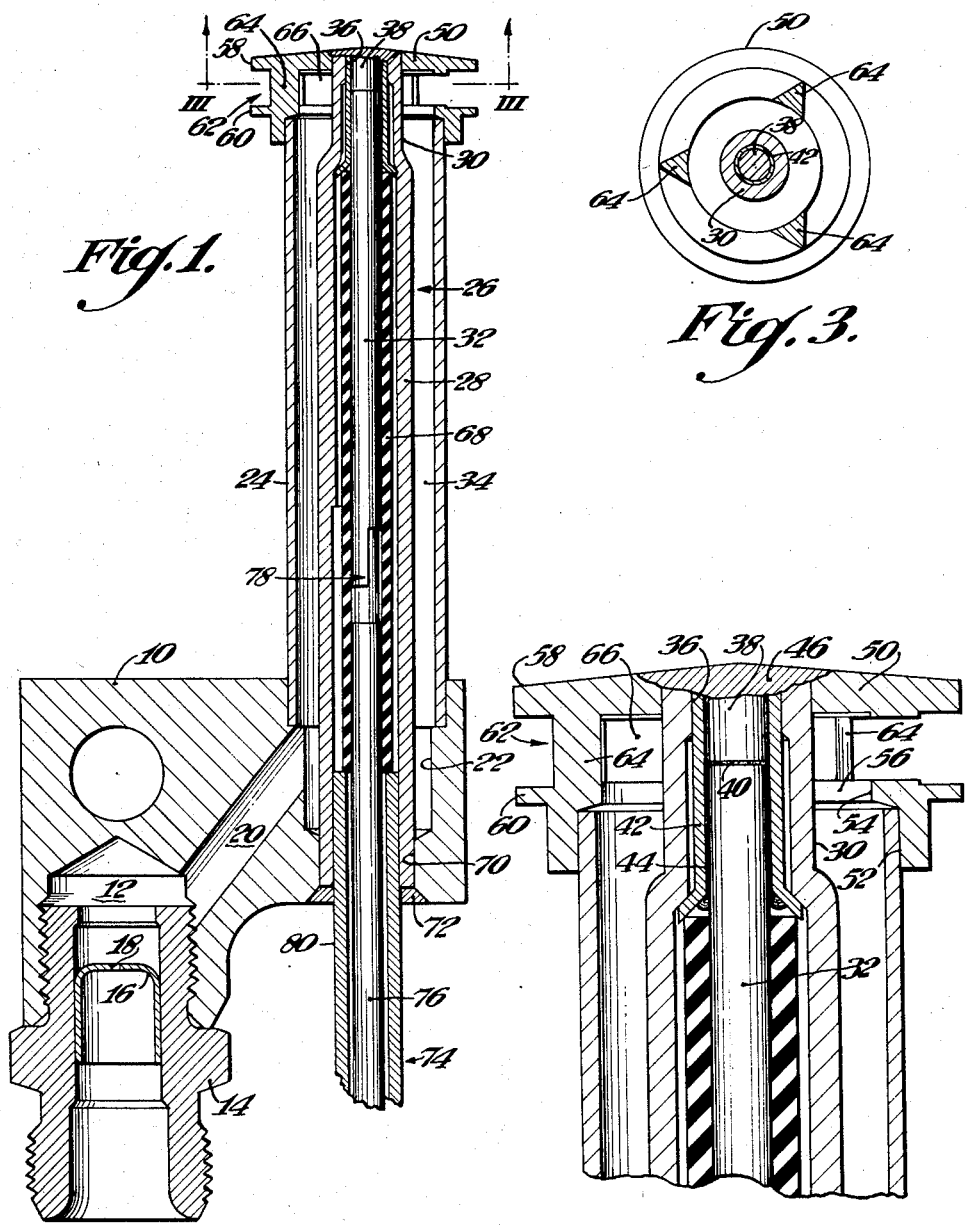

Wilbur F. Jackson, Compton, Calif., assignor to Robertshaw-Fulton Controls Company, Richmond, Va., a corporation of Delaware Filed Feb. 9, 1959, Ser. No. 791,998

4 Claims. (Cl. 136—4)

This invention relates to a combination pilot burner and thermocouple generator unit and more particularly to means for joining the thermocouple elements at the hot thermojunction.

In order to insure maximum heating of the hot thermojunction, it has been found desirable to construct the pilot burner in the form of a tubular member having a plurality of burner ports at one end thereof and to position an elongated thermocouple within the tubular member with the hot thermojunction of the thermocouple adjacent the pilot burner ports. The thermocouple is usually constructed of a tubular outer element and a rodlike inner element positioned within the tubular element.

In the construction of thermocouples of this type, it is desirable to use a chromium steel for the outer thermocouple element and a nickel-copper alloy for the inner thermocouple element. Previous methods of joining the inner and outer thermocouple elements consist of simply fusing the ends of the elements, such as by the well known "Heliarc" welding process, until a solid junction is formed at the ends. It is well known in the art that nickel, in the presence of a sulphur-carrying fuel gas, will acquire undesirable carbon deposits due to the cracking of the fuel gas. Hence, the previous joining methods are undesirable since the inner thermocouple element forms part of the resulting welded junction causing nickel to be included therein, whereby fuel gas flowing around the welded junction would cause an appreciable formation of carbon at this point.

Another difficulty encountered with thermocouple assemblies of this type is that after a number of heating and cooling cycles of the hot junction, there is a breakdown of the hot thermojunction weld due to either stress corrosion, expansion stresses or chemical breakdown of the chromium steel and nickel-copper alloy at the weld.

It is an object of this invention to eliminate any contact of the fuel gas or pilot flame with the inner element of a thermocouple assembly of the indicated type.

Another object of this invention is to shield the hot thermojunction of a thermocouple assembly of the described type from oxidation and exposure to hot gases.

Another object of this invention is to reduce the stress corrosion effect on the hot thermojunction weld of a thermocouple unit of the indicated type.

In a preferred embodiment of the invention, a piece of wire, which is of the same material as the nickel-free alloy of the outer thermocouple element, is butt welded to the end of the inner thermocouple to form a hot thermojunction. A tubular shield of nickel-free metal is then brazed to the inner thermocouple element so as to enclose the butt weld and the adjacent portions of the inner element and the nickel-free wire. This assembly is then inserted into the tubular outer thermocouple element with the shield and the nickel-free wire adjacent the burner port end of the outer thermocouple element. The outer thermocouple element is then fusibly united with the outer ends of the shield and the nickel-free wire to form a nickel-free weld.

The above and other objects and features of the invention will appear more fully from a consideration of the following description taken in connection with the accompanying drawings, wherein:

Fig. 1 is a sectional view of a preferred embodiment of the invention;

Fig. 2 is a fragmentary enlarged section of a detail of Fig. 1; and

Fig. 3 is a section taken on line III—III of Fig. 1.

Referring now more particularly to Fig. 1, there is shown a combination pilot burner and thermocouple generator unit comprising a burner support 10 having an inlet bore 12 in one end thereof in which one end of a nipple 14 is threaded. Nipple 14 may have the other end thereof connected to a supply conduit (not shown) which may extend to a suitable source of fuel. A flow limiter 16 having a small orifice 18 therein may be housed in nipple 14 to limit the supply of fuel to bore 12. An angular passageway 20 is formed in support 10 and serves to connect the end of bore 12 with a second bore 22 in support 10. Bore 22 is in spaced parallel relation to bore 12 and is adapted to receive a tubular burner body 24 and a thermocouple, generally indicated by the reference numeral 26.

Tubular burner body 24 has one end thereof secured within bore 22 adjacent the end of passageway 20 and the other end thereof extending from support 10 in axial alignment with bore 22. Thermocouple 26 is positioned within burner body 24 and includes an outer thermocouple element 28 of tubular form having a reduced neck portion 30 projecting above the upper end of burner body 24. A rod-like inner thermcouple element 32 is positioned within outer element 28 and has its uppermost end projecting partly into neck portion 30 and secured in a manner to be described hereinafter. It is to be noted that burner body 24 and elements 28 and 32 are preferably arranged about a common axis with outer element 28 being concentric with burner body 24. Since the outer diameter of outer element 28 is less than the inner diameter of burner body 24, an annular passageway 34 is provided therebetween permitting the flow of fuel from passageway 20 through burner body 24.

Outer element 28 is preferably made from 27% chromium steel and inner element 32 is preferably made from the well known alloy "Constantan" which consists of approximately 45% nickel and 55% copper. Since the presence of a sulphur-carrying gas would cause the nickel in inner element 32 to deposit carbon, it is necessary to protect the thermojunction between outer element 28 and inner element 32 from contact with the fuel gas. To this end, inner element 32 is positioned within neck portion 30 of outer element 28 to leave a recess 36 at the upper end of neck portion 30 to accommodate a piece of chromium steel wire 38 which is devoid of nickel and is butt welded at 40 to the upper extremity of inner element 32.

After hollow milling the bulb flash of butt weld 40, a stainless steel tubular thermocouple shield 42 is brazed to the inner element 32 and wire 38. Thermocouple shield 42 is made of nickel-free chromium stainless steel. Wire 38, butt weld 40 and the upper end of inner element 32 are all enclosed by the thermocouple shield 42. The brazing alloy 44 by which thermocouple shield 42 is brazed to the parts contained therein is a high temperature nickel-free brazing alloy. During the brazing operation, brazing alloy 44 flows between the inner wall of thermocouple shield 42 and the outer walls of wire 38, butt weld 40 and inner element 32 to provide a gastight seal for butt weld 40 and additional strength to the welded joint.

After the assembly comprising thermocouple shield 42, wire 38 and inner element 32 is inserted within the reduced neck portion 30, the uppermost ends of thermocouple shield 32 and wire 38 are fused to the open end of the neck portion 30 of outer element 28 by a suitable welding operation. The finished weld alloy, designated by the reference numeral 46, consists of the chromium steel furnished by outer element 28 and the nickel-free chromium steel from the adjacent part of wire 38. After the welding operation, a portion of wire 38 adjacent weld 40 remains unmelted. In this manner, the thermocouple 26 is formed with a hot thermojunction which comprises the rigid welded connection 40 between the upper end of inner element 32 and the unmelted portion of wire 38.

It is desirable that the pilot burner produce a flame in the location of the hot thermojunction which will constantly heat the same and will be, at the same time, sufficient to ignite a main burner (not shown). To this end, a flame retaining fitting 50 is fixed to the end of the neck portion 30 by welding in axial alignment therewith. Fitting 50 may be welded to neck portion 30 during the joining of the thermocouple elements 28 and 32 and is made of nickel-free chromium steel so that it does not affect the composition of weld alloy 46 as was previously described. Fitting 50 is welded to the burner body 24 at a recess portion 52 and is adapted to receive the upper end of burner body 24. A circular opening 54 in fitting 50 adjacent the open end of burner body 24 cooperates with neck portion 30 to define an annular flow passageway 56.

Fitting 50 comprises a pair of spaced flanges 58 and 60 defining an annular recess 62. Flanges 58 and 60 are separated and spaced by a plurality (in this case three) of integral circumferentially spaced vertical supports 64 which define an annular chamber 66 around neck portion 30. It will be apparent that the fuel emitted from annular flow passageway 56 will enter chamber 66 and be deflected radially between supports 64 into a recess 62. Thus, there will be an annular flow of fuel into a recess 62 and toward the periphery of flanges 58 and 60. It has been found that with a predetermined spacing of flanges 58 and 60, an annular wall of flame will occur on the periphery of upper flange 58, the lower flange 60 serving to prevent the impingement of the flame at the lower side of flange 58 within recess 62.

An insulating sleeve 68 of suitable material, such as "Fiberglas," is provided between outer element 28 and inner element 32 with one end thereof terminating short of neck portion 30 and the other end thereof terminating adjacent the lower end of outer element 28. The lower end of outer element 28 is received in a bore 70 in the lower section of support 10 and is suitably secured at 72, as by silver soldering. A conductor 74 has a portion thereof extending into the lower end of outer element 28 and includes an inner lead 76 which is connected to inner element 32 to form a cold junction 78 and an outer lead 80 which is connected to outer element 28. The other end of conductor 74 extends from support 10 for connection to a thermoelectric flame failure means (not shown), or other control means for conducting the current generated by thermocouple 26 to such means.

In operation, the pilot burner and thermocouple generator unit may be suitably connected for use in a heating appliance so that the pilot burner body 24 is positioned in proper lighting relationship with the main burner (not shown) of the appliance. Fuel may be supplied to the bore 12 by any suitable means and when supply is effected, fuel will flow from bore 12 through angular passageway 20, annular passageway 34, annular flow passageway 56 into recess 62.

The fuel issuing from recess 62 may be ignited by any suitable means and when an ignition is effected, a circular wall of flame will form around the periphery of flanges 58 and 60. This flame will be concentrated substantially at the periphery of flange 58. By reason of the spacing between flanges 58 and 60, shifting of the flame from the periphery of the flange 58 into recess 62 will be prevented even at minimum fuel supply conditions. It will be apparent that the heat produced by the flame will be conducted directly to the welded connection and hot junction 40 from the periphery of flange 58. Accordingly, sufficient flame is maintained in the proper location at all times to insure proper ignition of the main burner and proper heating of the hot thermojunction of thermocouple 26.

From the foregoing description, it will be apparent that a novel formation of the hot thermojunction provided wherein the nickel containing component of the inner thermocouple is prevented in any way from coming in contact with the surrounding atmosphere of the pilot burner unit by the provision of a shield member which encloses the hot thermojunction. In this manner, the life of the thermocouple is increased both by protecting the weld at the hot thermojunction from exposure to hot gases and oxidation and by decreasing the stress on the weld joint itself.

It is to be understood that although one embodiment of this invention has been shown and described for the purposes of illustration, the invention can be variously embodied and changes may be made in the construction and arrangement of the parts without departing from the scope of the invention as defined by the appending claims.

I claim:

1. A method of forming the hot thermojunction for a thermocouple having an elongated nickel-containing conductor encased in a nickel-free metallic cylinder comprising the steps of positioning a relatively short piece of nickel-free metallic rod in axial alignment and in end to end abutting relationship with respect to said conductor, fusibly uniting the abutting ends of said conductor and said rod, positioning a nickel-free metallic tubular shield so as to enclose said rod, the fusibly united portion between the abutting ends of said rod, said conductor, and a portion of said conductor adjacent said fusibly united portion, fusibly uniting said shield to said conductor and said rod, inserting said conductor, said rod and said shield into a nickel-free metallic cylinder with the rod end of the shielded portion adjacent the open end of said cylinder and the conductor end remote therefrom, and welding the outermost ends of said rod and said shield with a portion of said cylinder adjacent said open end whereby said weld is composed of a nickel-free alloy.

2. A method of forming the hot thermojunction for a thermocouple having an elongated nickel-containing conductor encased in a nickel-free metallic cylinder comprising the steps of positioning a relatively short piece of nickel-free metallic rod in axial alignment and in end to end abutting relationship with respect to said conductor, butt welding the abutting ends of said conductor and said rod, positioning a nickel-free metallic tubular shield so as to enclose said rod, said butt weld and a portion of said conductor adjacent said butt weld, brazing said shield to said rod and said conductor by means of a nickel-free brazing alloy which flows between the inner wall of said shield and the outer walls of said rod, said butt weld and said conductor to form a gastight seal for said butt weld, inserting said conductor, said rod and said shield into a nickel-free metallic cylinder with the rod end of the shielded portion adjacent the open end of said cylinder and the conductor end remote therefrom, and welding the outermost ends of said rod and said shield with a portion of said cylinder adjacent said open end whereby the last-named weld is composed of a nickel-free alloy.

3. In a thermocouple, the combination comprising a first thermocouple element of nickel-containing metal, a tubular thermocouple element of nickel-free metal in radially spaced coaxial relation to said first element and projecting beyond one end thereof to form a recess, an insert portion of nickel-free metal in said recess having one end welded to said one end of said first element, and a tubular shield of nickel-free metal enclosing said insert portion, said weld and a portion of said first element and being fusibly united to the same, said insert portion having its opposite end welded to said tubular thermocouple element together with the adjacent end of said insert portion leaving an unmelted section of nickel-free metal between said first thermocouple element and said opposite end of said insert portion.

4. In a combination pilot burner and thermocouple, a first thermocouple element of a first metal, a tubular thermocouple element of substantially nickel-free metal in radially spaced coaxial relation to said first element and having a projecting portion beyond one end thereof to form a recess, an insert portion of said substantially nickel-free metal in said recess having one end welded to said one end of said first element to form a hot thermojunction, a tubular shield of nickel-free metal enclosing said insert portion, said weld and said one end of said first thermocouple element and being fusibly united to the same for protecting said first thermocouple element against contact with the surrounding atmosphere and means for maintaining a flame adjacent said thermojunction including a flame retaining member of substantially nickel-free metal welded to the opposite end of said portion, to one end of said tubular shield and to said projecting portion leaving an unmelted section of substantially nickel-free metal adjacent one end of said first thermocouple element.

References Cited in the file of this patent
UNITED STATES PATENTS

| | | |
|---|---|---|
| 2,649,490 | Greenamyer | Aug. 18, 1953 |
| 2,792,440 | Biggle | May 14, 1957 |
| 2,833,843 | Jackson et al. | May 6, 1958 |